United States Patent
Haynie et al.

(10) Patent No.: US 12,290,873 B2
(45) Date of Patent: May 6, 2025

(54) FRICTION STIR ADDITIVE METHOD AND MACHINE

(71) Applicant: BOND TECHNOLOGIES, INC., Elkhart, IN (US)

(72) Inventors: Timothy John Haynie, Union, MI (US); John A. Bosker, South Bend, IN (US)

(73) Assignee: BOND TECHNOLOGIES, INC., Elkhart, IN (US)

( * ) Notice: Subject to any disclaimer, the term of this patent is extended or adjusted under 35 U.S.C. 154(b) by 9 days.

(21) Appl. No.: 18/313,118

(22) Filed: May 5, 2023

(65) Prior Publication Data

US 2023/0356322 A1 Nov. 9, 2023

Related U.S. Application Data

(60) Provisional application No. 63/364,272, filed on May 6, 2022.

(51) Int. Cl.
| | |
|---|---|
| *B23K 20/12* | (2006.01) |
| *B33Y 10/00* | (2015.01) |
| *B33Y 30/00* | (2015.01) |

(52) U.S. Cl.
CPC ...... *B23K 20/1215* (2013.01); *B23K 20/1235* (2013.01); *B23K 20/125* (2013.01); *B33Y 10/00* (2014.12); *B33Y 30/00* (2014.12)

(58) Field of Classification Search
None
See application file for complete search history.

(56) References Cited

U.S. PATENT DOCUMENTS

| | | | | |
|---|---|---|---|---|
| 6,732,900 | B2 * | 5/2004 | Hansen | B23K 20/123 228/2.1 |
| 7,597,237 | B2 * | 10/2009 | Ghosh | B23K 20/1275 228/2.1 |
| 7,654,435 | B2 * | 2/2010 | Kumagai | B23K 20/1265 228/2.1 |
| 8,632,850 | B2 * | 1/2014 | Schultz | C23C 26/00 427/180 |
| 8,636,194 | B2 * | 1/2014 | Schultz | B23K 20/1225 228/2.1 |
| 10,092,975 | B2 * | 10/2018 | Twelves, Jr. | B23K 20/1215 |
| 10,688,588 | B2 * | 6/2020 | Twelves, Jr. | B33Y 10/00 |
| 11,311,959 | B2 * | 4/2022 | Hardwick | C22C 1/0416 |
| 2007/0288104 | A1 * | 12/2007 | Yamauchi | G06F 3/014 700/52 |

(Continued)

FOREIGN PATENT DOCUMENTS

CN 107470772 A * 12/2017 .......... B23K 20/122

*Primary Examiner* — Devang R Patel
(74) *Attorney, Agent, or Firm* — BOTKIN & HALL, LLP; Michael D. Marston

(57) ABSTRACT

An additive friction stir deposition machine and the method of using it. The friction stir deposition machine has a stationary tool with a fixed shoulder and an opening. The fixed shoulder is fixed from rotation with respect to a substate onto which feedstock material is deposited to build a layer. A guide tube holds the feedstock material and is rotatable within the stationary tool. The opening in the stationary shoulder circumscribes the open end of the guide tube. The feedstock material is co-rotatable with the guide tube and rotating the guide tube rotates with the feedstock.

8 Claims, 9 Drawing Sheets

(56) References Cited

U.S. PATENT DOCUMENTS

| | | | |
|---|---|---|---|
| 2009/0200275 A1* | 8/2009 | Twelves, Jr. ........... | B33Y 30/00 427/591 |
| 2012/0009339 A1* | 1/2012 | Creehan ............. | B23K 20/1245 427/180 |
| 2021/0046579 A1* | 2/2021 | Rodriguez ............. | B33Y 30/00 |

* cited by examiner

FRICTION STIR ADDITIVE METHOD AND MACHINE

CROSS-REFERENCE TO RELATED APPLICATIONS

This application claims the benefit of the U.S. Patent Ser. No. 63/364,272, filed May 6, 2022, which is incorporated herein by reference in its entirety.

BACKGROUND

Additive manufacturing by friction stir deposition is a known process that uses friction between a consumable feedstock material and a non-consumable substrate material. In such a process, the feedstock, generally in the form of a rod is rotated and held within a tool that also rotates with the feedstock rod. As such, both the tool and feedstock rod rotate with respect to the surface that is to be built up. The feedstock rod is consumed as it is added to a substrate, but the tool holding the feedstock rod, rotating adjacent to the material to be welded, is not consumed. This process is shown in U.S. Pat. No. 8,636,194. This process has the capacity to add material to the substrate plate to create a two-dimensional pattern on the substrate plate and then to subsequently build layer upon layer to create a three-dimensional form. However, this process does not provide sufficient control. Localizing the heat is important to control the heat in the feedstock rod and the substrate material. Failure to control heat may cause an inconsistent material deposit that may vary in size, mechanical properties, and surface finish. Failure to control heat may also cause problems for the tooling that holds the feedstock rod and associated machinery used to facilitate rotation of the feedstock rod. Additionally, allowing heat to propagate in an uncontrolled manner may cause deformation in the substrate material or in the built-up form. Another source of variability in prior art processes for deposition is that the tool itself rotates against the upper surface of the plasticized layer being deposited and creates an inconsistent finish in the final weld and heat input which is not beneficial to the process.

SUMMARY OF THE INVENTION

The present invention is an additive friction stir deposition machine and the method of using it. The additive friction stir deposition machine has a stationary tool that includes a fixed shoulder and an opening in the fixed shoulder. The fixed shoulder is fixed from rotation with respect to a substrate onto which material will be deposited to build a layer thereon. A guide tube is rotatable within the stationary tool. The guide tube has a chamber with an open end that is adjacent to the opening in the stationary tool. The open end of the guide tube is for facing the substrate and the opening in the stationary shoulder circumscribes the open end of the guide tube. The chamber in the guide tube is for containing feedstock material that will be deposited upon the substrate. The feedstock material is co-rotatable with the guide tube and the feedstock material is fixed from rotation with respect to the guide tube.

The guide tube may have spiral grooves that direct any feedstock material that is between the stationary tool and the guide tube inwardly toward the chamber of the guide tube. The stationary tool may also include holes that allow for the escape of feedstock material from the stationary tool that is not driven inwardly by the grooves.

Additionally, the stationary tool may include passages for the flow of cooling fluid to circulate through it. The guide tube may include passages as well that allow the circulation of cooling fluid through the rotating guide tube and allow it to remain at a stable temperature within the stationary tool.

DETAILED DESCRIPTION OF THE INVENTION

Figure 1:
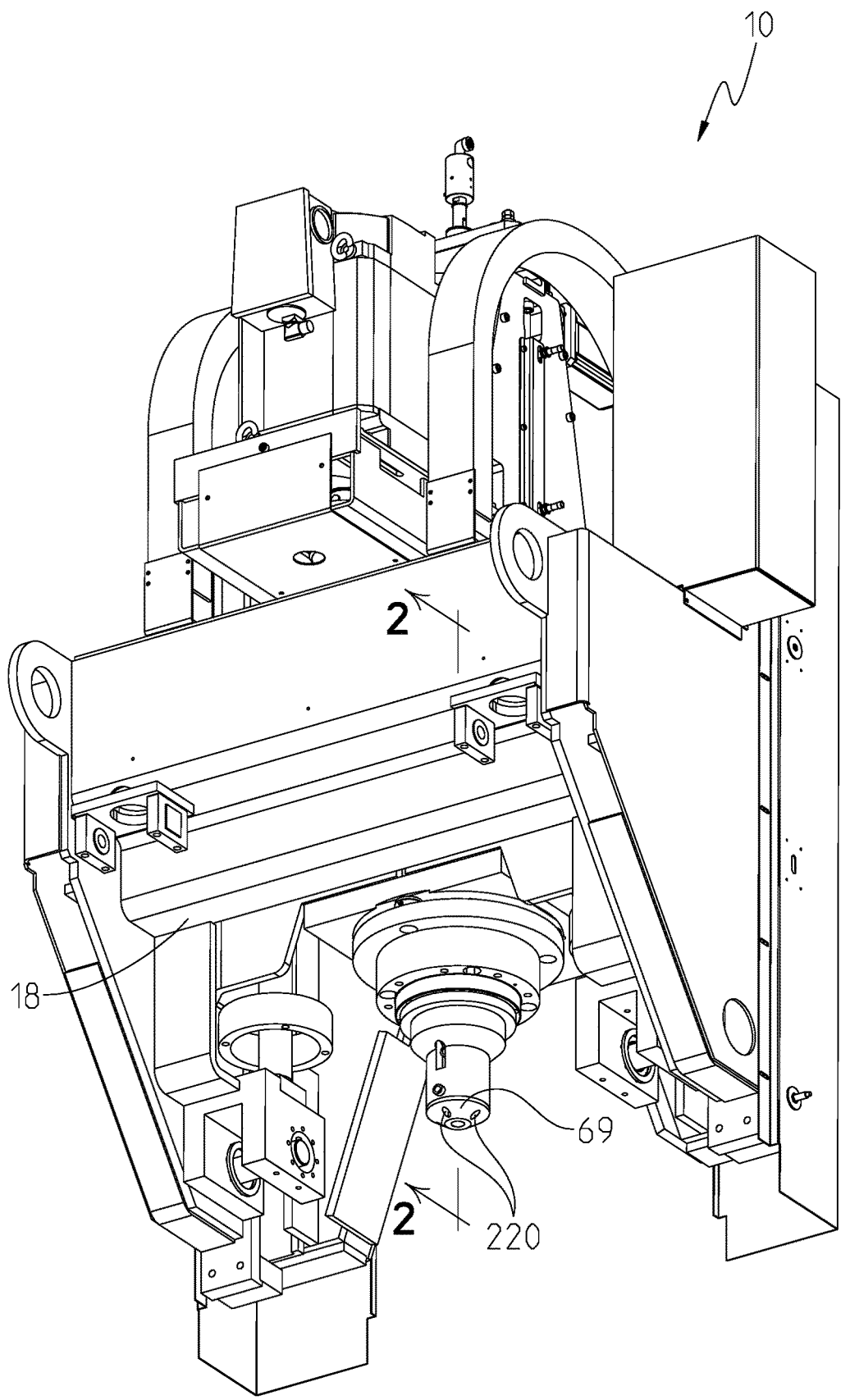
FIG. 1 is a perspective view of the upper portion of the additive friction stir deposition machine.
Figure 2:
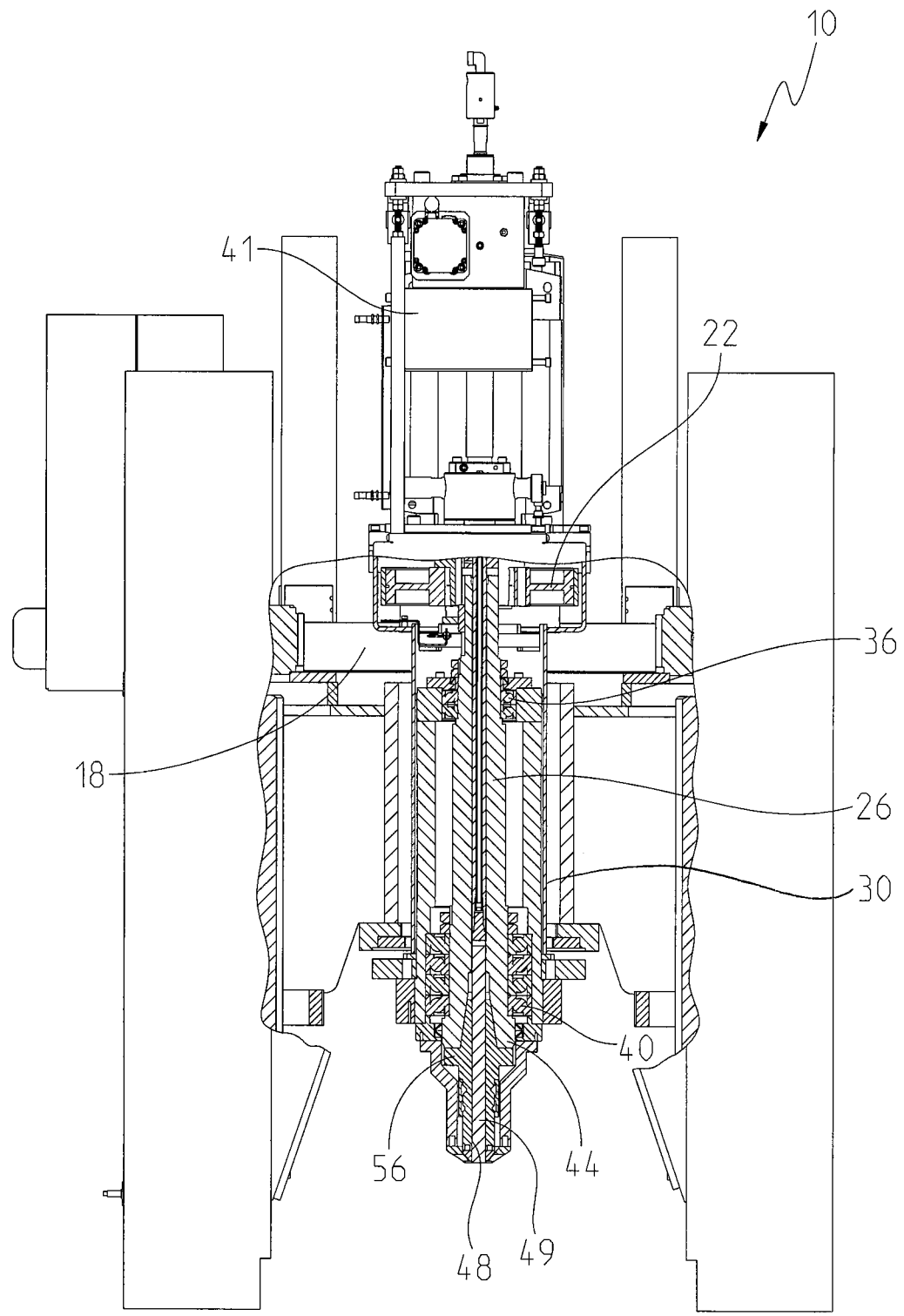
FIG. 2 is a sectional view taken about line 2-2 in FIG. 1.
Figure 3:
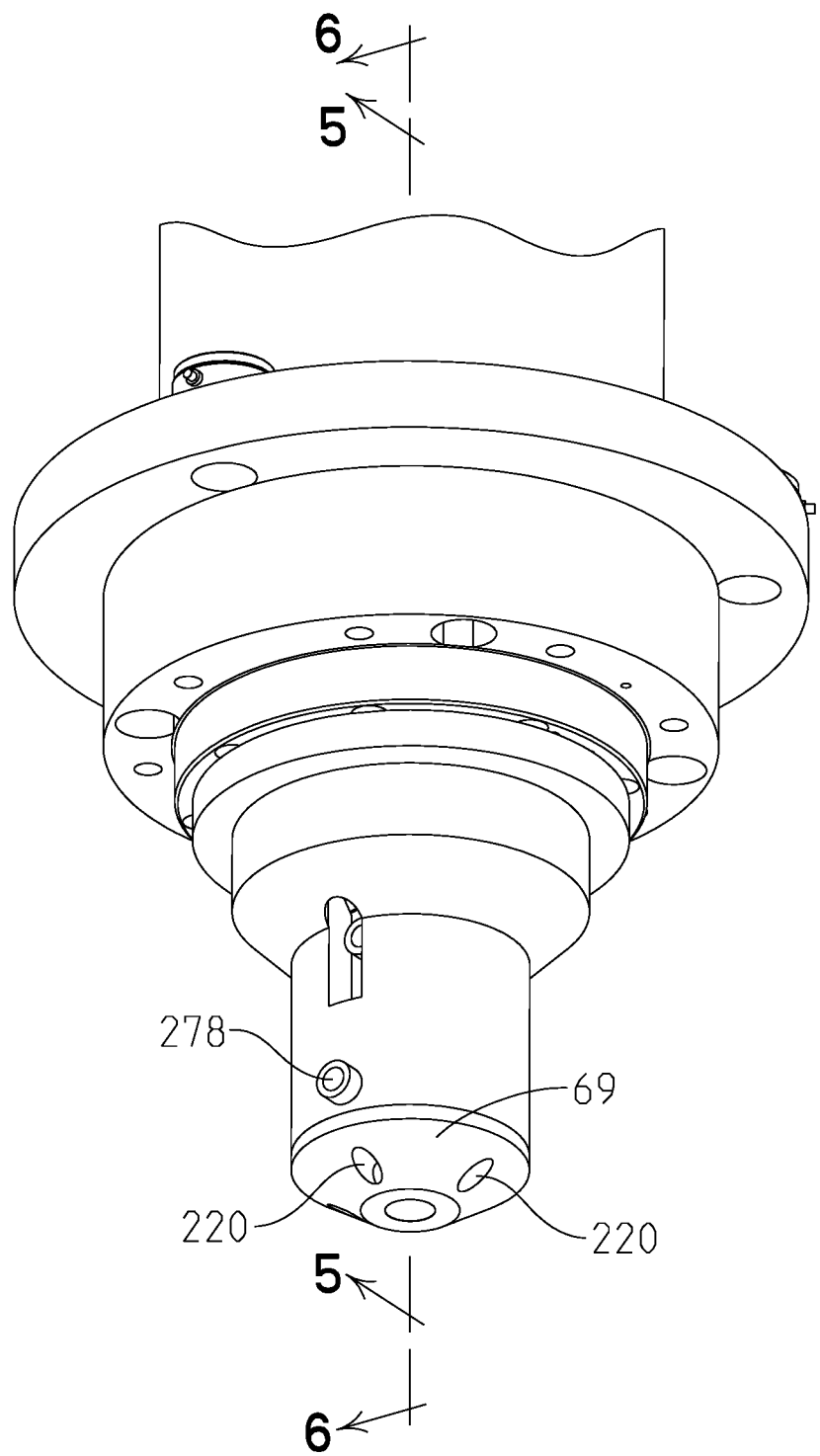
FIG. 3 is a perspective view of the non-rotating shoulder and mounted to the spindle housing shown in FIGS. 1 and 2.
Figure 4:
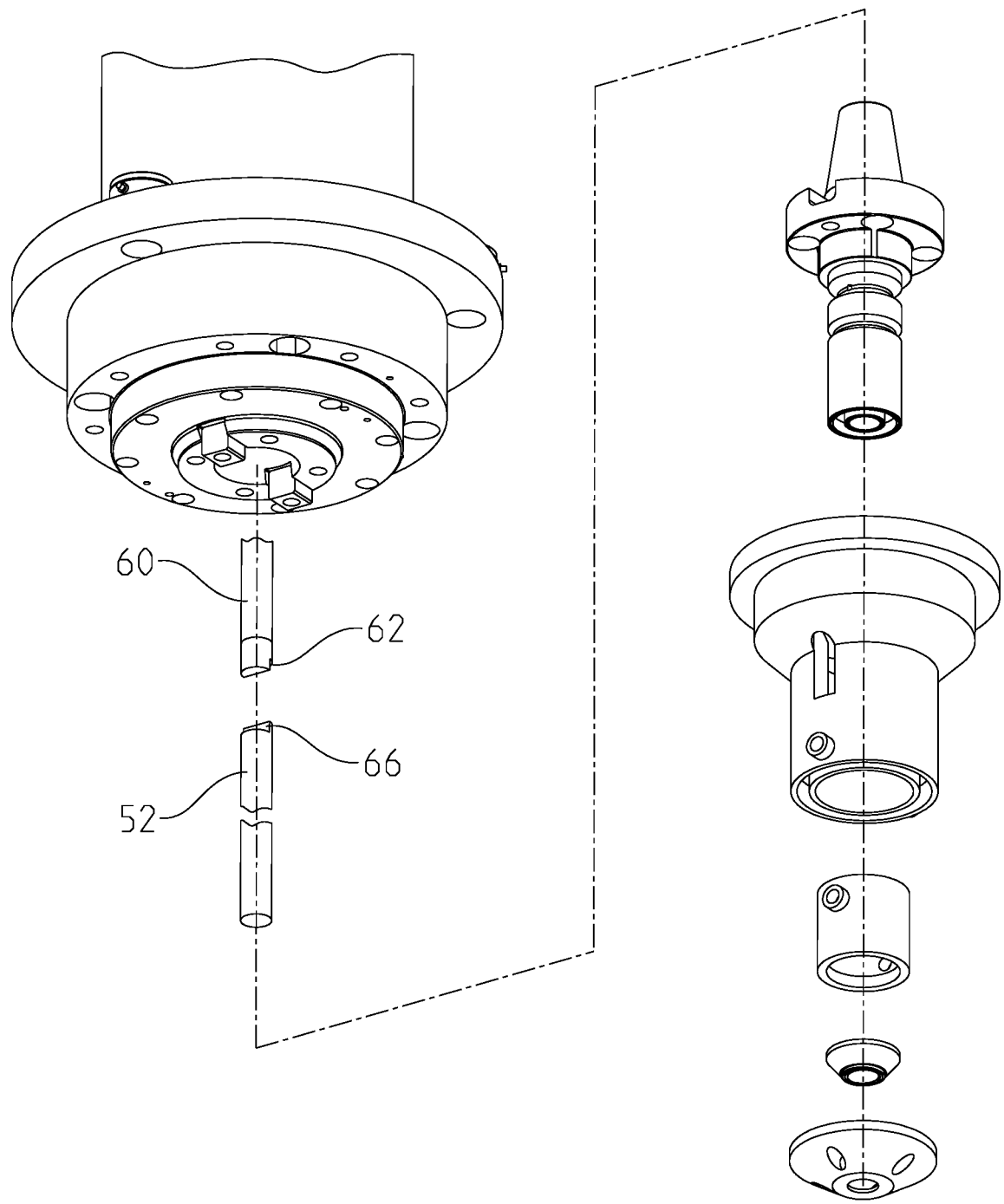
FIG. 4 is an exploded view of the spindle tooling of the additive friction stir deposition machine shown in FIGS. 1-3.

The present invention is for the machine used in additive deposition of material and the method of performing the stir deposition. FIG. 1 shows a perspective view of the upper portion of the machine 10 that is used for the deposition of material. The portion shown is the gantry assembly comprises of the spindle, spindle drive, Z-axis, and Y-axis for the machine. The gantry 18 is mounted above a movable X-axis which is capable of moving through the gantry legs. It is recognized that many other configurations of machines (or robots) can be utilized provided that the machine is capable of controlling the relative motion of the spindle relative to the workpiece. FIG. 2 shows the machine 10 has a gantry 18 with a drive pulley 22 that rotates a main spindle shaft 26. The main spindle shaft 26 is held within a spindle housing 30 that is held from rotation with respect to the gantry 18. The main spindle shaft 26 is hollow and rotates within the spindle housing 30 about upper bearings 36 and lower bearings 40. The bearings 36, 40 are angular contact bearings that allow for the main spindle shaft 26 to receive significant axial loading while it rotates. The drive pulley 22 is connected to a motor 41 that causes the drive pulley 22 and main spindle shaft 26 to rotate together. Near the lower end 44 of the main spindle shaft 26 is a tapered interface in which is mounted to a guide tube 56. The interior portion of the guide tube 56 is a chamber 48 that is used for containing a rod of feedstock material 52. The guide tube 56 is considered replaceable tooling which may easily be changed for different sizes and shapes of feedstock material.

The chamber 48 is formed from a hole 49 within a guide tube 56. The guide tube 56 is held within the main spindle 26 and the chamber 48 may extend from the replaceable guide tube 56 up into the main spindle 26. A hole 57 in the main spindle 26 that is aligned with the hole 49 in the guide tube 56 defines the upper end 59 of the chamber 48 that holds the feedstock material 52. The chamber 48 has an open end 61 that is opposite the upper end 59. The guide tube 56 rotates with the main spindle tube 26.

The chamber 48 extends upwardly to a push rod 60. The push rod 60 rotates with the main spindle 26 about axis 63 that is central to the push rod 60 as well as the main spindle 26. The pushrod 60 may include a driving feature (step) 62 to fit into a complementary driven feature (step) 66 of the feedstock material 52. In the case that the feedstock material 52 is round, the driving feature 62 being a step 66 within the feedstock material 52 will mate in a complementary manner with the step 62 in the pushrod. In the case that the feedstock material 52 is a rod that is not round, such as a hexagonal cross section or a square cross section, the driving feature 62 in the pushrod 60 may not be necessary because the chamber 48 would be able to rotate the feedstock material 52 due to the chamber 48 having a complementary fit with the feedstock material 52. The push rod 60 has a biasing force applied to it that urges it to move with respect to the main spindle in a direction toward the open end 61. The pushrod 60 is controlled by a process controller that may be operated in a velocity control mode or a force-controlled mode. In the velocity-controlled mode, a desired forward velocity of the pushrod is maintained that drives the feedstock material 52 toward a substrate 80 at a desired velocity. In force-controlled mode, the pushrod 60 is urged toward the substrate 80 with a desired force. It is also possible to utilize a frictional drive such as a collet (not shown) to apply both axial and torsional forces to the feedstock.

The guide tube 56 has its open end 61 located directly behind a stationary tool 69 having a shoulder 70. The stationary tool 69 and its shoulder 70 are fixed from rotation with respect to the spindle housing 30. The stationary tool 69 and shoulder 70 are also maintained at a desired elevation with respect to a substrate 80 onto which the feedstock material 52 is to be deposited. The stationary tool 69 has an orifice 78 that is the same diameter or slightly larger than the open end 61 of the guide tube 56.

The stationary tool 69 is held above a substrate 80 that may be moved laterally relative to the stationary tool 69 by a table 84 to which the substrate 80 is fastened. The substrate 80 can be moved according to CNC controllers. Any machine configuration (moving spindle or moving workpiece) may be used so long as the relative motion of the spindle and the workpiece can be accurately controlled. The stationary tool 69 is termed a stationary tool 69 because it is fixed from rotation about the spindle axis. While relative lateral movement of the stationary tool 69 is possible, rotation of the stationary tool 69 does not occur with respect to the substrate 80. The feedstock material 52 is rotated with respect to the substrate 80 as it is biased against the substrate 80. The feedstock material 52 rotates about the axis 63 that coincides with the central axis of the guide tube 56, but it is contemplated the feedstock material may be offset from the axis. Such a case may be when multiple feedstock material 52 rods are held in the guide tube 56 (which is not shown). As the feedstock material 52 warms to the plastic state through frictional heating, any oxide layer on the substrate is disbursed by the scrubbing action of the feedstock material 52 as it rotates. While the feedstock material 52 is in its plastic state, it will thoroughly conform to the substrate 80 and form an area of contact that is shielded from ambient air. As such, no shielding gas is needed when the feedstock material 52 is deposited onto the substrate 80 for materials such as aluminum. It is noted that shielding gas may be needed to prevent oxidation of hot material as it exits the stir zone when working with materials such as copper, titanium or steel. Minimizing the area of the substrate 80 that is plasticized will minimize warping or any other undesirable effects due to heat propagating to an area away from the area where the feedstock material 52 is being deposited. Ideally, only a predetermined amount of the substrate 80 is plasticized through frictional heating that is proportional to the desired width of material to be deposited. In other words, having heat spread farther than necessary to achieve the desired deposition is undesirable and should be carefully controlled to avoid the undesirable effects mentioned above.

Controlling the location of the heat generated by the frictional stirring of the feedstock material 52 against the substrate 80 may be done by choosing the diameter of the feedstock material 52. Controlling the total heat input and maximum process temperature may be done by using closed loop temperature control. This may be implemented by utilizing a temperature sensor within the stationary tool 69 and modulating the main spindle shaft 26 torque or rotational speed to control heat input.

An effective way to prevent binding of feedstock material 52 to the guide tube 56 and minimize heat generation in the feedstock material 52 in an undesired location is to have the guide tube 56 rotate with the feedstock 52 so there is no relative rotational movement between the guide tube 56 and the feedstock 52. Having the only movement between the guide tube 56 and the feedstock material 52 being the necessary axial movement to feed the feedstock material 52 axially toward the substrate 80 reduces a potential source of heat that can plasticize the feedstock material 52 above the substrate 80. This type of movement may be also termed co-rotation because the feedstock material 52 rotates with the guide tube 56 and the feedstock material 52 is fixed from rotation with respect to the guide tube 56. The guide tube 56 may also include anti-friction coatings within the chamber 48 to prevent the feedstock material 52 from sticking to the guide tube 56. The stationary tool 69 may also have anti-friction coatings as well to prevent the plasticized material from sticking.

Figure 5:
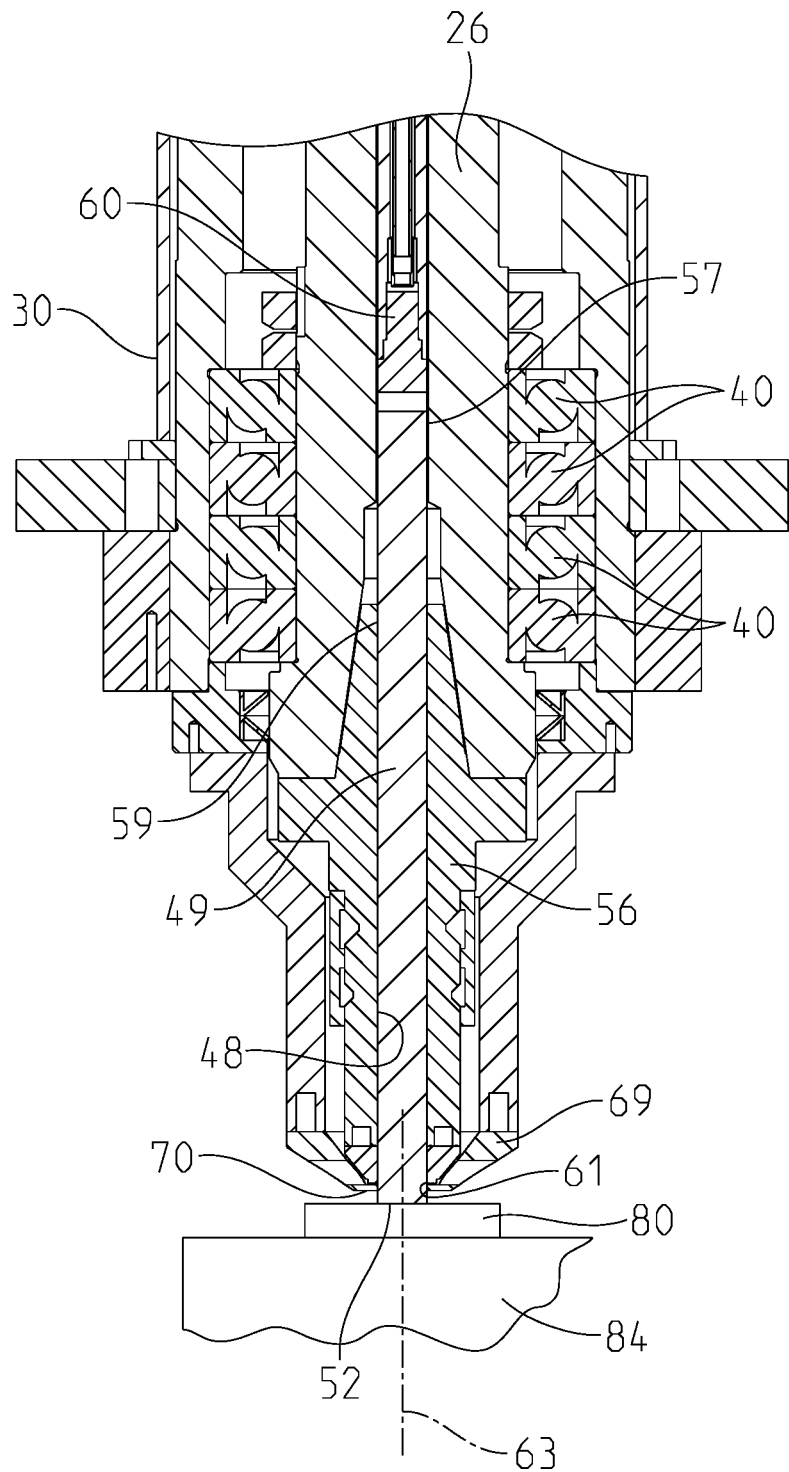
FIG. 5 is a sectional view taken about the line 5-5 in FIG. 3.
Figure 6:
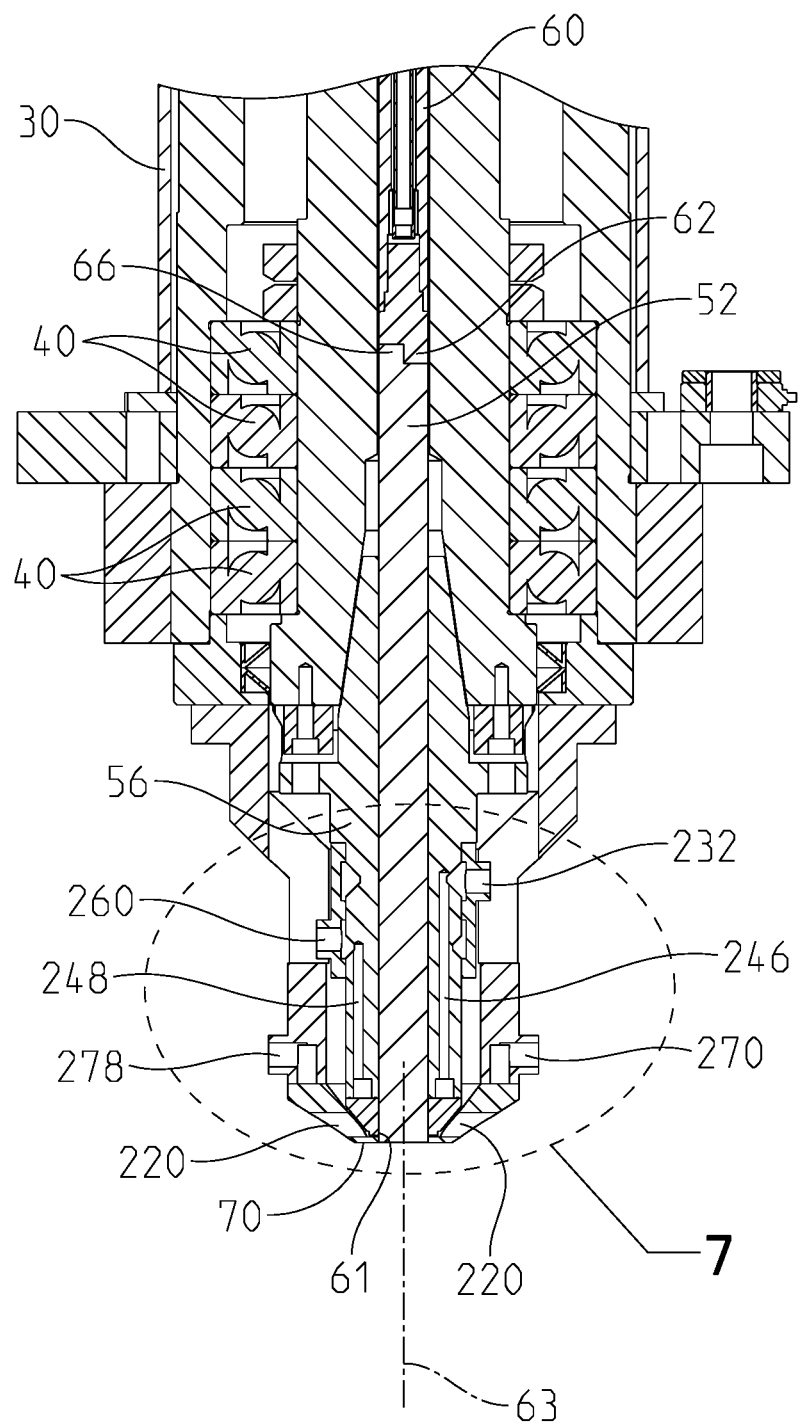
FIG. 6 is a sectional view taken about the line 6-6 in FIG. 3.

FIG. 5 shows how the guide tube 56 rotates within the stationary tool 69 in a magnified view. When the guide tube 56 rotates with respect to the stationary tool 69 it is imperative that plasticized feedstock material 52 not be forced between the guide tube 56 and the stationary tool 69. As such, there must be very little or no clearance between the guide tube 56 and the stationary tool 69 to permit plasticized feedstock material 52 from seeping between those parts.

Although having no clearance between the guide tube 56 and the stationary tool 69 is theoretically desirable, that may not be possible under real world conditions. In practice, it may be possible for plasticized feedstock material 52 to seep between the guide tube 56 and the corresponding stationary tool 69. FIGS. 7-10 show a method to control the potential flow of plasticized feedstock material 52 so that it does not climb around the guide tube 56 and potentially jamb its rotation and thereby generate additional heat through friction in an undesirable location. The guide tube 56 includes a spiral surface 210 located at the lower end of the guide tube 56. The spiral surface 210 of the guide tube 56 rotates adjacently to a stationary tool 69 in which the guide tube 56 rotates. The spiral surface 210 may have small clearance with respect to an inner surface 71 within the stationary tool 69 that is internal to the stationary tool 69 and opposite the fixed shoulder 70. The spiral surface 210 has grooves 211 machined into it in a spiral pattern so that the rotating direction of the guide tube 56 tends to push any feedstock material 52 inwardly. The grooves 211 define the spiraled pattern by having portions radially nearer said chamber 48 when traversing the grooves 211 along their length. The guide tube 56 is rotated in such a manner that the grooves 211 urge the material inwardly toward the chamber 48. It is noted that out utilizing a spiral to move material may be desirable in some cases. The stationary tool 69 has holes 220 that are offset from the fixed shoulder 70 to allow any feedstock material 52 that escapes radially outwardly due to the hydrostatic pressure of the plasticized material to exit the stationary tool 69. The holes 220 are useful because although the grooves 211 urge material inwardly toward the chamber 48, some excess feedstock material 52 may escape through holes 220 to the extent that the rotating grooves 211 cannot contain excess feedstock material 52. The excess feedstock material 52 that may escape is considered flash, which is wasted material that is minimized by the current invention. As such, any feedstock material 52 that may jam between the guide tube 56 and the stationary tool 69 is prevented from building in the space between the guide tube 56 and stationary tool 69.

Figure 7:
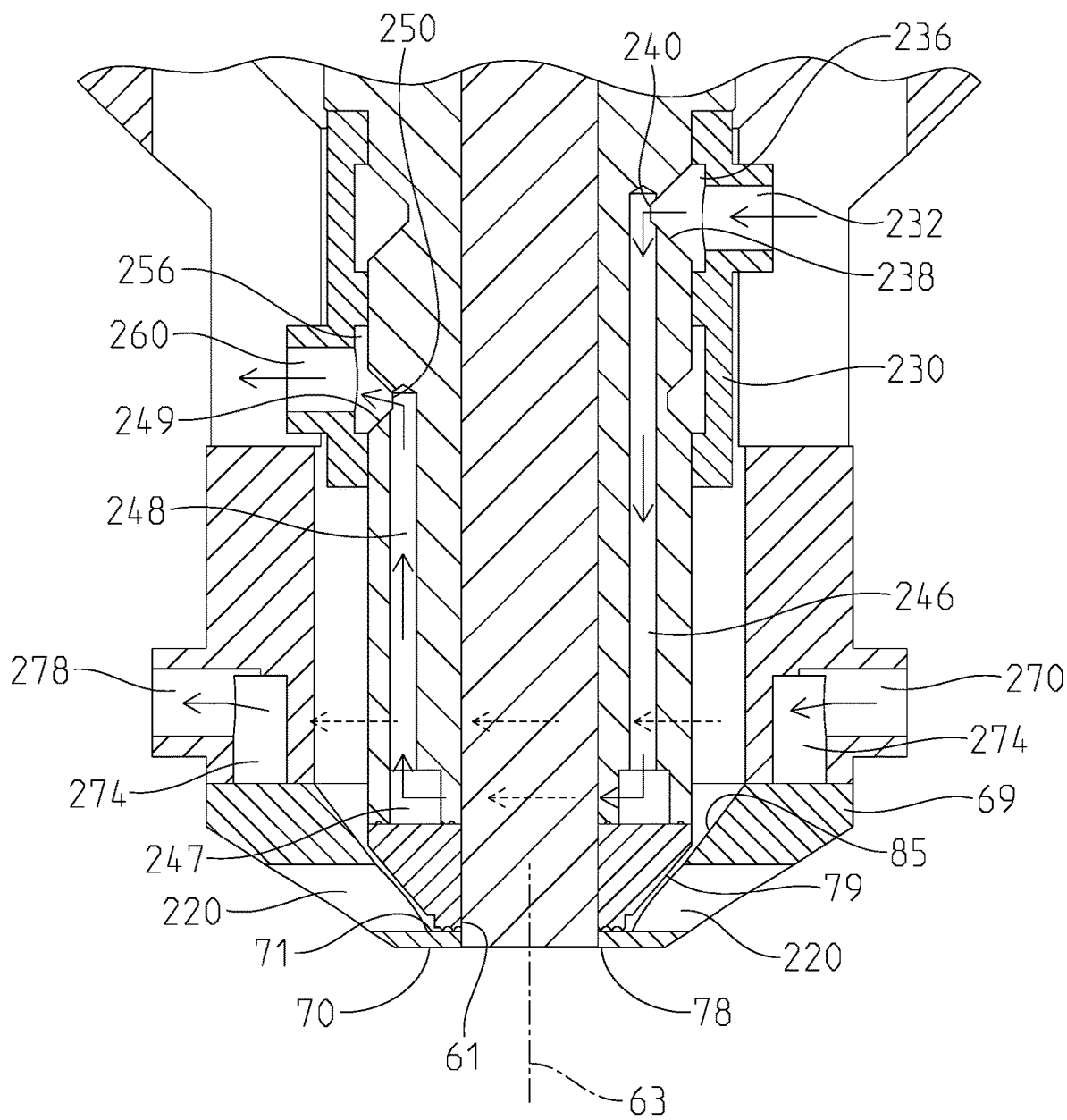
FIG. 7 is the magnified area 7 shown in FIG. 6.
Figure 8:
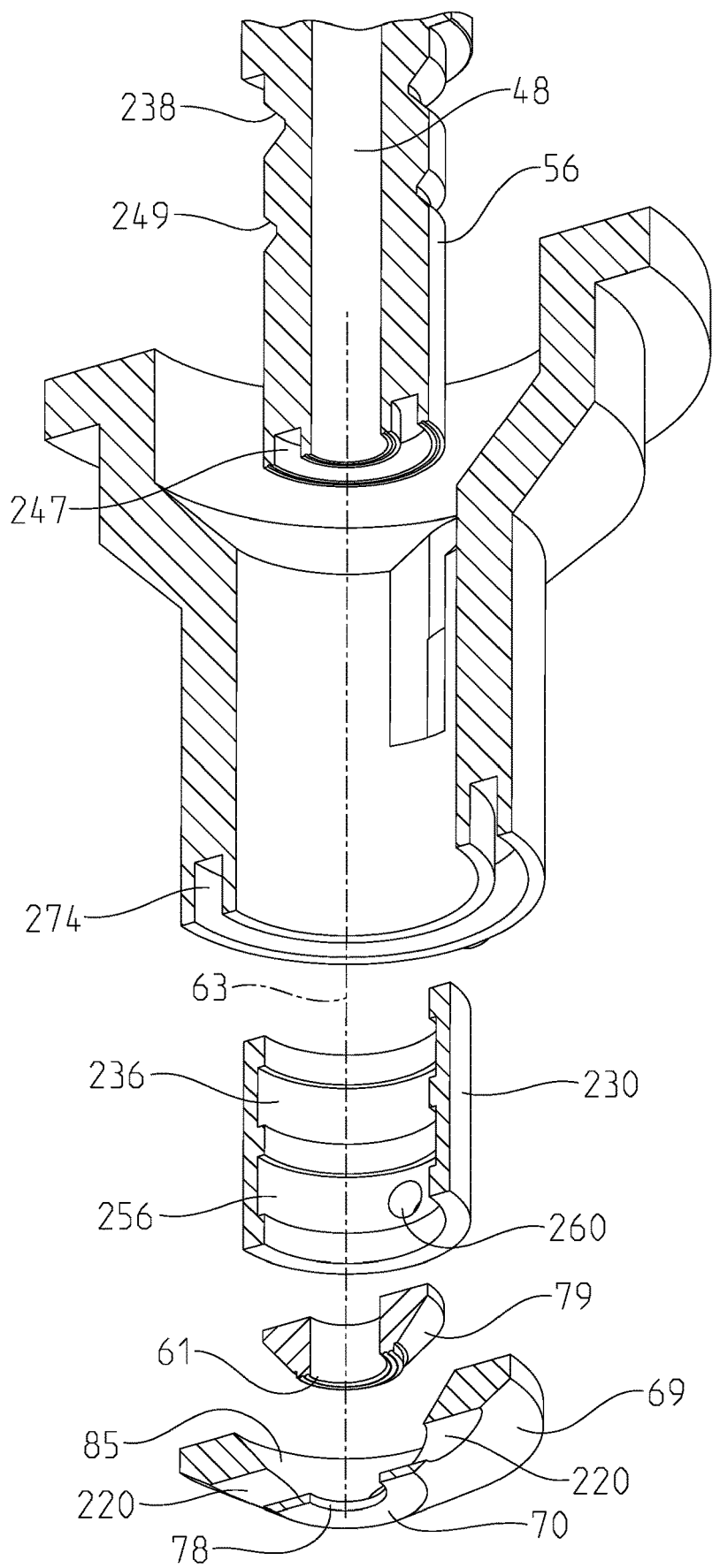
FIG. 8 is an exploded sectional view of the rotating and non-rotating tooling and fixed shoulder shown in FIG. 1-7.
Figure 9:
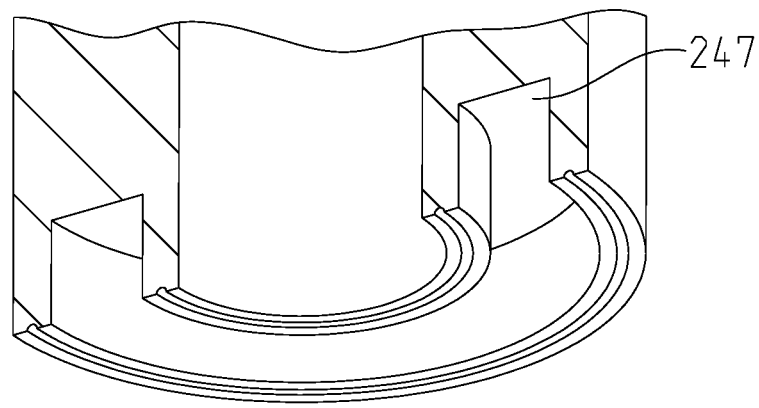
FIG. 9 is a sectional view of the guide tube and annular passage of the friction deposition machine shown in FIGS. 1-8 with the opening of the guide tube separated therefrom.
Figure 10:
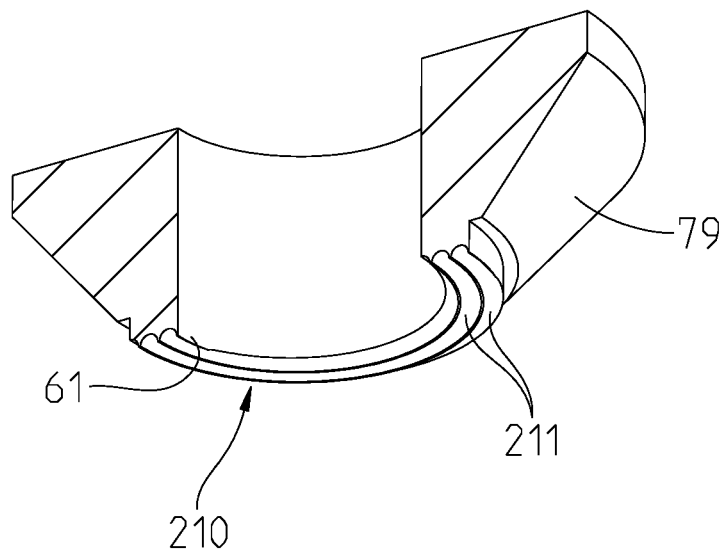
FIG. 10 is a sectional view of the lower cap of the guide tube separated from the guide tube and showing the opening of the lower cap within the machine shown in FIGS. 1-9.

The guide tube 56 has cooling features that localize the heat generated by the stir deposition process. The guide tube 56 rotates within a cooling collar 230 that is water cooled. The cooling collar 230 is fixed from rotation with respect to substrate 80 onto which the feedstock material 52 will be deposited. The cooling collar 230 is also fixed from rotation with respect to the spindle housing 30. The cooling collar 230 has a water inlet port 232 that continues to an annular water manifold 236 so that water is sealed between the manifold 236 and the rotating guide tube 56. The annular water manifold 236 is a groove that extends around the circumference of the guide tube 56. Water travels from the manifold 236 into a groove 238 that is located on the guide tube 56. A hole 240 on the guide tube 56 intersects with groove 238 and hole 240 rotates within manifold 236. The water then travels from hole 240 into cooling passage 246 within the guide tube 56. The water circulates to an annular passage 247 that is connected to cooling passage 248. The water then travels up cooling passage 248 in the guide tube 56 until it reaches hole 250 that intersects with groove 249. Hole 250 rotates with the guide tube 56 and connects to manifold 256 that is connected to water outlet port 260. Cooling passage 246 is diametrically opposite cooling passage 248 within guide tube 56 and this facilitates cooling axially along the guide tube between cooling passages 246, 248. Manifold 236 is axially spaced above manifold 256 and both are sealed with respect to the guide tube 56 that rotates within the manifolds 236, 256 so that the flow path shown in FIG. 7 is possible. Correspondingly, the holes 240 and 250 are axially spaced to align with manifolds 238 and 256 respectively. The aligned arrangement of holes 240, 250 with manifolds 236, 256 provides a flow path that allows efficient cooling through the guide tube 56 while it rotates with respect to the ports 232 and 260 that are fixed from rotation with respect to the guide tube 56. The annular passage 247 cools the lower portion of the guide tube and cools the lower cap 79 which helps to prevent thermal expansion and radial deformation of the feedstock within the guide tube 56 which is known to produce high axial friction and potentially sticking of the feedstock within the guide tube. This also prevents the lower cap 79 from expanding into inner surface 85 of the stationary tool 69.

In addition to cooling water being circulated through the guide tube 56, water is also circulated through the stationary tool 69. Inlet port 270 connects to annular manifold 274. The annular manifold 274 acts as a path for cooling of the stationary tool 69. Although the annular manifold 274 is not directly connected to the rotating guide tube 56, it circumscribes the rotating guide tube 56. Water can flow from inlet port 270 through the annular manifold 274 to outlet port 278. Circulating water through the stationary tool 69 as described above is an additional way to localize the heat generated from the friction deposition process. With such cooling, the temperature of the stationary tool 69 is stabilized resulting in a repeatable steady state process.

The invention is not limited to the details above, but may be modified within the scope of the following claims.

What is claimed is:

1. A friction stir deposition machine for building a layer upon a substrate comprising:
a guide tube having a chamber extending axially within said guide tube and having an open end for facing said substrate, said chamber for receiving a rod of feedstock material therein;
a stationary tool having a fixed shoulder located thereon, said fixed shoulder being fixed from rotation with respect to said substrate, said fixed shoulder having an opening therein and said opening in said fixed shoulder circumscribing said open end of said chamber, said stationary tool having an inner surface and said inner surface being internal to said stationary tool, said guide tube being rotatable within said stationary tool, said stationary tool including an inlet for receiving cooling fluid to be directed into a first annular manifold circumscribing said guide tube, said guide tube including a first hole located within said first annular manifold and rotatable with respect to said first annular manifold, said stationary tool including an outlet for directing said cooling fluid from a second annular manifold circumscribing said guide tube, said guide tube including a second hole located within said second annular manifold and rotatable with respect to said second annular manifold, said first hole in said guide tube in fluid communication with said second hole in said guide tube to facilitate flow of said cooling fluid through said guide tube, wherein said first hole is connected to a first axial passage and said second hole is connected to a second axial passage and said first and second axial passes for facilitating fluid flow between said first and second holes in said guide tube, said first and second axial passages being diametrically oppositely located within said guide tube; and
a motor connected to said guide tube for rotating said guide tube with respect to said fixed shoulder and said rod of feedstock rotating with said guide tube so that said rod of feedstock rotates with respect to said substrate.

2. The friction stir deposition machine of claim 1, wherein said guide tube includes grooves on an end surface, said grooves having a spiral pattern, said stationary tool including said fixed shoulder and having said inner surface opposite to said fixed shoulder on said stationary tool and said inner surface internal to said stationary tool, said grooves being rotatable with said guide tube adjacent to said inner surface and said grooves being rotatable in a direction to urge said feedstock located between said inner surface of said stationary tool and said grooves toward said chamber in said guide tube.

3. The friction stir deposition machine of claim 2, wherein said stationary tool includes holes adjacent to said grooves of said guide tube.

4. The friction stir deposition machine of claim 1, wherein said first manifold is axially spaced from said second manifold along said guide tube.

5. A friction stir deposition machine for building a layer upon a substrate comprising:
- a stationary tool having a fixed shoulder thereon being fixed from rotation with respect to said substrate, said fixed shoulder having an opening therein, said stationary tool including an inner surface and said inner surface being internal to said stationary tool;
- a guide tube having a chamber with open end adjacent to said opening in said stationary tool, said open end for facing said substrate and said guide tube rotatable within said stationary tool, said opening in said stationary tool circumscribing said open end of said guide tube, said chamber for containing a feedstock material therein, said feedstock material co-rotatable with said guide tube and said feedstock material being fixed from rotation with respect to said guide tube wherein rotation of said guide tube causes said feedstock material to rotate with respect to said stationary tool and said stationary tool including an inlet for receiving cooling fluid to be directed into a first annular manifold circumscribing said guide tube, said guide tube including a first hole located within said first annular manifold and rotatable with respect to said first annular manifold, said stationary tool including an outlet for directing said cooling fluid from a second annular manifold circumscribing said guide tube, said guide tube including a second hole located within said second annular manifold and rotatable with respect to said second annular manifold, said first hole in said guide tube in fluid communication with said second hole in said guide tube to facilitate flow of said cooling fluid through said guide tube wherein said first hole is connected to a first axial passage and said second hole is connected to a second axial passage and said first and second axial passages for facilitating fluid flow between said first and second holes in said guide tube; and
- a motor connected to said guide tube for rotating said guide tube with respect to said stationary tool.

6. The friction stir deposition machine of claim 5, wherein said guide tube includes grooves on an end surface, said grooves having a spiral pattern, said grooves being rotatable with said guide tube in a direction to urge said feedstock located between said inner surface and said grooves toward said chamber in said guide tube.

7. A friction stir deposition machine for building a layer upon a substrate comprising:
- a stationary tool having a fixed shoulder thereon being fixed from rotation with respect to said substrate, said fixed shoulder having an opening therein, said stationary tool including an inner surface opposite said fixed shoulder and internal to said stationary tool, said stationary tool;
- a guide tube having a chamber with an open end adjacent to said opening in said stationary tool, said open end having an inner diameter and an outer diameter defining an end surface, said end surface of said guide tube adjacent to said inner surface within said stationary tool and said guide tube rotatable within said stationary tool, said opening in said fixed shoulder of said stationary tool surrounding said open end of said guide tube, and said inner diameter of said guide tube being at least as large as said opening in said fixed shoulder of stationary tool, said chamber for containing feedstock material therein, said feedstock material co-rotatable with a guide tube and said feedstock material being fixed from rotation with respect to said guide tube wherein rotation of said guide tube causes said feedstock material to rotate with respect to said stationary tool; and
- a motor connected to said guide tube for rotating said guide tube with respect to said stationary tool.

8. The friction stir deposition machine of claim 7, wherein said stationary tool includes an inlet for receiving cooling fluid to be directed into a first annular manifold circumscribing said guide tube, said guide tube including a first hole located within said first annular manifold and rotatable with respect to said first annular manifold, said stationary tool including an outlet for directing said cooling fluid from a second annular manifold circumscribing said guide tube, said guide tube including a second hole located within said second annular manifold and rotatable with respect to said second annular manifold, said first hole in said guide tube in fluid communication with said second hole in said guide tube to facilitate flow of said cooling fluid through said guide tube wherein said first hole is connected to a first axial passage and said second hole is connected to a second axial passage and said first and second axial passages for facilitating fluid flow between said first and second holes in said guide tube.

* * * * *